Jan. 27, 1925.
H. TIPPER ET AL
DIRECTION INDICATOR
Filed April 14, 1924
1,524,066
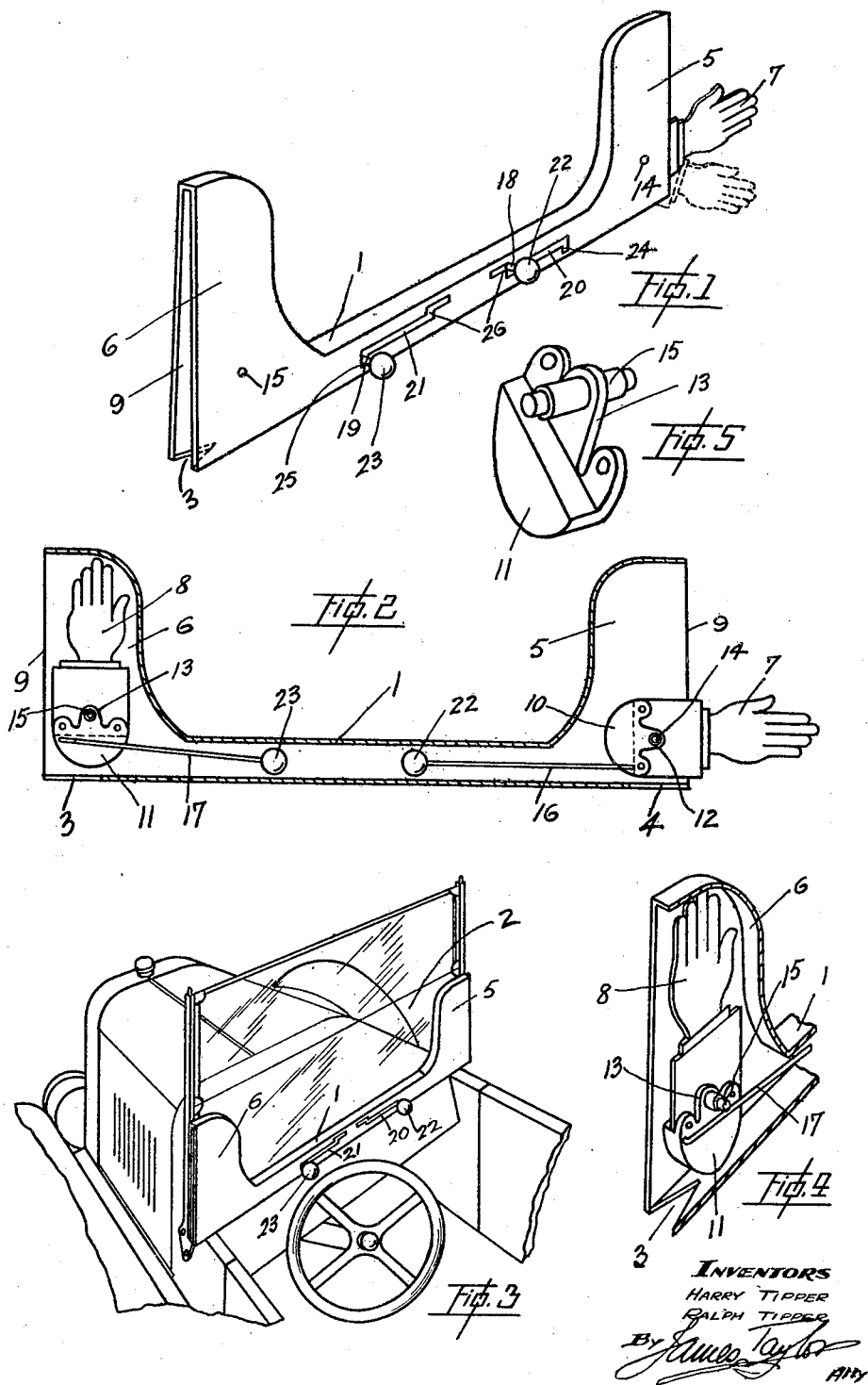

Patented Jan. 27, 1925.

1,524,066

UNITED STATES PATENT OFFICE.

HARRY TIPPER AND RALPH TIPPER, OF NORTH VANCOUVER, BRITISH COLUMBIA, CANADA.

DIRECTION INDICATOR.

Application filed April 14, 1924. Serial No. 706,313.

*To all whom it may concern:*

Be it known that we, HARRY TIPPER and RALPH TIPPER, both subjects of the King of Great Britain, and both residents of the city of North Vancouver, in the Province of British Columbia, Canada, have invented certain new and useful Improvements in Direction Indicators, of which the following is a specification.

Our invention relates to improvements in direction indicators, and the object of our invention is to provide a device of this character which is simple and cheap to construct, manufacture, and maintain and which is readily and easily applied to an automobile of either the open or closed type for manipulation by the driver from within the car to indicate the direction of travel of the car, either straight ahead or to the right or left, as the case may be, or stopping or turning round as at intersections, bends, or turns in streets or highways, thereby enabling observers to determine the course of the car and thus avoiding accident, and which device is so constructed that the signal member after the signal is made returns to the normal position of its own accord automatically and without requiring manual operation to effect its return, thus eliminating the possibility of the driver leaving the signal in the signalling position after the necessity for moving it to such position is past.

We attain this object by the construction illustrated in the accompanying drawings in which—

Fig. 1 is a rear side view of our device, in outside elevation.

Fig. 2 is a rear view, the rear side plate being removed.

Fig. 3 is a fragmentary perspective view of an automobile illustrating the practical application of our invention thereto.

Fig. 4 is an enlarged view of the left hand signalling hand.

Fig. 5 is an enlarged detail view in perspective of the signalling hand weight.

Similar figures of reference indicate similar parts throughout the several views.

The device consists of a casing 1 formed preferably out of sheet metal designed to extend the full width of the windshield 2 and project beyond the side edges of the same when placed behind it an amount equal to the length of V-shaped notches 3 and 4 cut respectively out of the bottom of the casing at each end, which notches allow for the movement of the signalling hands from the horizontal position, as hereinafter described. The intermediate portion of the casing is much less in depth than the end portions, which are extended vertically and broadened to form right and left hand housings 5 and 6 for the right and left hand signalling hands 7 and 8, as shown more particularly in Figs. 2 and 4, and the outer end of each housing is open, as at 9 in Fig. 1, so that the hands may be swung outwardly therethrough when signalling.

The hands 7 and 8 are formed preferably of sheet metal and they are each secured at their lower ends to a heavy counterweight, 10 and 11 respectively, each of which weights is provided intermediate the length of its upper edge with an upstanding lug, 12 and 13 respectively, so that pivot pins, 14 and 15, secured into and extending through the respective lugs to project beyond the sides of the same, are thus disposed in a plane higher than that of the upper edge of their respective weights. These pivot pins are mounted in the side walls of their respective housings 5 and 6 from which it will be seen that the hands are swingably mounted within the housings and are maintained in a normally vertical position by the weights 10 and 11.

To operate the respective hands rods 16 and 17 are provided which extend longitudinally within the casing, the outer ends of the rods being connected to their respective weights 10 and 11 close to their upper and outer edges, while their inner ends are bent rearwardly at right angles as at 18 and 19 and extend slidably through slots 20 and 21 cut in the rear wall of the casing, each end being provided with a button, 22 and 23 respectively. The slots are provided at their outer ends with depressed notches 24 and 25 in which the respective rod ends 18 and 19 are seated when the signalling hands are in their normal positions, while intermediate their length the slots are stepped up, as at 26 in Fig. 1, the point where the continuity of the slot is broken indicating the limit of travel of the rods 16 and 17 and their respective button ends to project the hands horizontally while the remaining or stepped up portion of the slot permits further movement of the button ends to move the hands to the downwardly inclined position, as indicated by the dotted lines in Fig. 1, the V-shaped notches 3 and 4, hereinbefore mentioned, enabling the hand to take up the last-mentioned position.

The manner in which the device is installed will be readily seen, on referring to Fig. 3, and its operation also, as it will be obvious that, either hand being in the normal vertical position, as shown at the left hand of Fig. 2, it may be moved to the horizontal position, as shown at the right hand of Fig. 2, to indicate turning to the right or left, according to which hand is projected, by gripping the button of that hand and moving it inwards till it reaches the point of the slot indicated by the numeral 26, or to the downwardly inclined position, as indicated by the dotted lines at the right hand of Fig. 1, to indicate slowing or stopping, by continuing to move the button till the extreme inner end of the slot is reached. On letting go the button, the signalling hand is automatically returned to its normal vertical position within its housing by its counterweight so that the hand cannot remain projected through forgetfulness of the operator to return it, and, due to the placing of the pivot point of each weight at a point considerably higher than the upper edge of the weight the full benefit of the counterbalance in returning the hand smoothly and quickly is obtained. The straight ahead direction of the car is, of course, indicated when both hands are in their normal vertical positions within the housings.

From the foregoing it will be seen that we have provided a simple and inexpensive device for indicating the direction of travel of an automobile, auto truck, or other like moving vehicle, which is highly practical and efficient.

What we claim as our invention is:—

1. A direction indicator comprising a casing having its opposite ends open and extended vertically to form housings, a signalling hand within each housing, an operating rod for each hand extending longitudinally within the casing the respective inner ends of which are projected slidably through slots provided in the rear wall of the casing the length of each of which governs the longitudinal movement of its respective rod projecting the respective hand downwardly and each of which is stepped up intermediate its length to provide a limiting point for the rod movement projecting the hand horizontally, and a weight secured to the lower end of each hand to which the outer ends of the respective rods are respectively connected, said weights being pivotally mounted in the respective housings and adapted to maintain the hands normally vertical and return them and their respective rods to their normal positions from any position to which they may be moved.

2. A direction indicator comprising a casing having its opposite ends open and extended vertically to form housings, a signalling hand within each housing, an operating rod for each hand extending longitudinally within the casing the respective inner ends of which are projected slidably through slots provided in the rear wall of the casing the length of each of which governs the longitudinal movement of its respective rod projecting the respective hand downwardly and each of which is stepped up intermediate its length to provide a limiting point for the rod movement projecting the hand horizontally, and a weight secured to the lower end of each hand to which the outer ends of the respective rods are respectively connected, each said weight being provided intermediate the length of its upper edge with an upstanding lug through which extends a pivot pin at a point spaced above the said edge, said pin engaging the casing walls to pivotally hang the weight whereby its hand is maintained normally vertical and is automatically returned to its normal position by the pull of the weight from any position to which it may be swung.

3. A direction indicator comprising a casing having its opposite ends open and extended vertically to form housings in the bottom of each of which is provided a V-shaped notch forming a right-angled continuation of the end opening of the housing, a signalling hand within each housing secured at its lower end to a weight pivotally mounted in the housing the influence of which maintains the hand normally vertical, said hand being movable manually from the normal vertical position against the pull of the weight to enter the V-shaped notch and being automatically returnable therefrom due to the pull of the weight, when free from manual control and an operating rod for each hand extending longitudinally within the casing the respective outer ends of which are connected to the respective weights the respective inner ends being projected slidably through slots in the casing wall designed to permit operation of said rods.

Dated at Vancouver, B. C., this 4th day of April, 1924.

HARRY TIPPER.
RALPH TIPPER.